Figure 1:
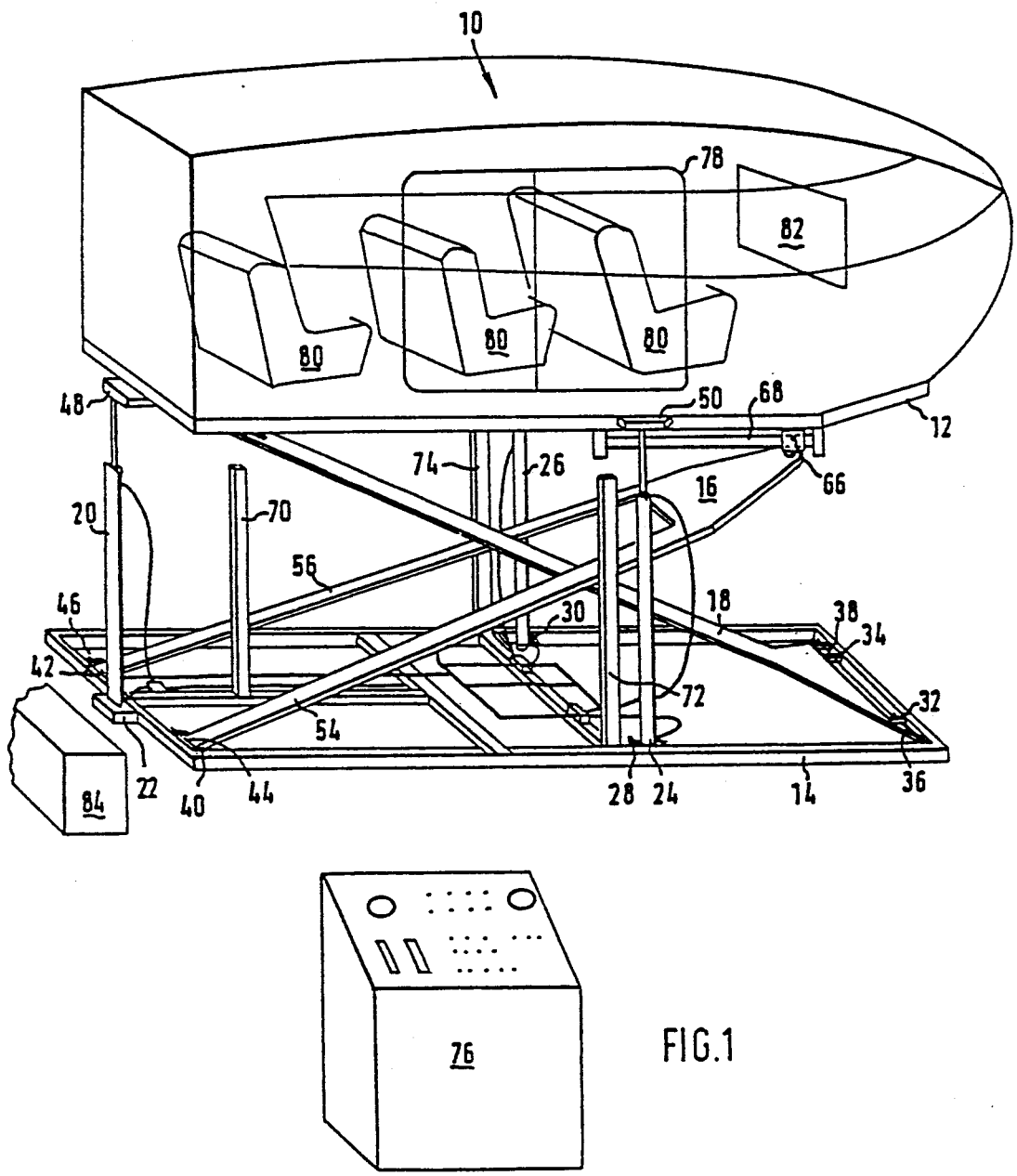

United States Patent [19]

Denne

[11] Patent Number: 5,071,352
[45] Date of Patent: Dec. 10, 1991

[54] MOTION-SIMULATOR MECHANISMS

[76] Inventor: Phillip Michael R. Denne, 7 Lyndon Gate, Chine Crescent Rd., Bournemouth, Dorset BH2 5LG, Great Britain

[21] Appl. No.: 572,950

[22] PCT Filed: Mar. 22, 1989

[86] PCT No.: PCT/GB89/00336
§ 371 Date: Nov. 13, 1990
§ 102(e) Date: Nov. 13, 1990

[87] PCT Pub. No.: WO89/09463
PCT Pub. Date: Oct. 5, 1989

[30] Foreign Application Priority Data

Mar. 25, 1988 [GB] United Kingdom ............... 8807221

[51] Int. Cl.⁵ ................................................ G09B 9/00
[52] U.S. Cl. ..................................... 434/29; 434/58
[58] Field of Search ................. 434/29, 58, 38, 55, 434/59, 46; 272/1 C, 18, 31 R

[56] References Cited

U.S. PATENT DOCUMENTS

| | | | |
|---|---|---|---|
| 3,577,659 | 5/1971 | Kail | 434/58 |
| 3,619,911 | 11/1971 | Pancoe | 434/58 |
| 3,645,011 | 2/1972 | Callanen | 434/58 |
| 3,967,387 | 7/1976 | Marchegiani | 434/58 |
| 4,343,610 | 8/1982 | Chou | 434/58 |
| 4,753,596 | 6/1988 | Hart et al. | 434/29 |

Primary Examiner—Richard J. Apley
Assistant Examiner—Glenn E. Richman

[57] ABSTRACT

A simulator mechanism has a simulator capsule (10) mounted on a platform (12) which provides a simulator operating plane. Three independent hydraulic rams (20, 24 and 26) are used to change the position of the simulator operating plane. The actuators (20, 24, and 26) are pivotally coupled at separate points on the platform (12). The weight of the simulator capsule (10) is carried by the three actuators (20, 24 and 26). Two of the actuators are positioned on a line perpendicular to a longitudinal axis of both the base plane annd the simulator operating plane. The third actuator (20) is positioned at one end and on the longitudinal axis of the base plane. Restraining mechanisms (16 and 18) are in the form of A-frames.

11 Claims, 5 Drawing Sheets

MOTION-SIMULATOR MECHANISMS

The present invention relates to motion simulator mechanisms and in particular to motion simulator mechanisms to simulate the rides given in motor vehicles, land vehicles, water borne vehicles, space vehicles etc.

A number of motion mechanisms are known with a restricted number of degrees of freedom. For example mechanisms are described in GB 2068322. U.S. Pat. No. 4,019,261 and U.S. Pat. No. 4,551,101.

It is also known to produce mechanisms which provide motion in three degrees of freedom i.e. the axes of heave, pitch and roll. These mechanisms are known for entertainment purposes. In particular such mechanisms are described in U.S. Pat. No. 4,066,256 and our co-pending application GB 8722853.

GB 8722853 relates to improvements in the design of hinged frame, three axes motion systems in which the disposition of the rams is arranged so that they form a flexible tetrahedron with the platform which is to be moved. On the other hand, U.S. Pat. No. 4,066,256 shows rams in an essentially vertical or inclined position coming from three separate points on the base of the mechanism.

There are problems in using vertical pillar systems because of the difficulties relating to the bracing of the universal joint on one or more of the pillars.

GB 1224505 describes similar mechanisms which relate to ground based flight simulating apparatus. The apparatus includes framework which carries the weight of the simulating mechanism from above. The disadvantage of such an arrangement is that the mounting framework must be designed to withstand significant lateral and rotational forces so that extra weight is required in the apparatus as a whole in order to provide a strong structure.

GB 1146213 shows a flight simulator in which all primary forces are transmitted via actuators. All the linkages shown are both primary force transmitters as well as restraining means. There is a significant loss of efficiency in the linkage mechanisms because of the number of frictional pivots between the simulator and the actuators.

GB 954357 relates to a simulator which operates in pitch and roll only and does not have three degrees of motion.

According to the present invention there is provided a motion simulator mechanism which has intersecting roll and pitch axes.

According to the present invention there is provided a simulator mechanism capable of operating in three degrees of freedom and having intersecting roll and pitch axes comprising a base having a fixed plane, a simulator capsule having a simulator operating plane, the base being below the simulator operating plane, three independent extendible actuators capable of changing the position of the simulator operating plane, the three actuators being pivotally coupled at separate points on the fixed plane of the base and at separate points on the simulator operating plane, the weight of the simulator capsule and the simulator operating plane when in operation being carried by the three actuators, the line joining two of the actuators being positioned perpendicular to a longitudinal axis of both the base plane and the simulator operating plane, the third actuator being positioned at one end and on the longitudinal axis of the base plane, at least two passive restraining mechanisms being provided to prevent unwanted motion in yaw, surge and sway axes, the restraints being pivotally connected along the roll axis in the same simulator operating plane as the coupling points of the actuators.

It is preferred that the centre of mass of the simulator capsule is located between the connecting points of the actuators in or above the simulator operating plane of the capsule.

The actuators are coupled to operate in heave, pitch and roll axes and have restraining means to prevent unwanted motion in yaw, surge and sway axes. The actuators are preferably hydraulic rams having extendible pistons. However other types of actuators may also be used such as pneumatic pistons, electric actuators, rack and pinion actuators operated by electric motors and actuators comprising ball and nut operating in a rotating screw rod.

The restraining means are preferably frames such as A frames or equivalent thereto e.g. rigid T or Y frames, referred to herein generally as A frames, to provide stiffness. The A frames are pivotally mounted at each apex of the frames. However, other restraining means may be provided. In particular, rest pillars may be provided to take the weight of the simulator capsule in a rest position when the actuators are not pressurized.

The purpose of the restraining mechanism, which is preferably contained between the actuators, is to allow the simulator mechanism to operate in the three degrees of freedom required i.e. the heave, pitch and roll axes, but at the same time to control the system in the three uncontrolled axes which are yaw, surge and sway axes. The principle forces between the plane on which the simulator is mounted i.e. the simulator operating plane and the fixed base plane, are preferably not coupled through the simulator structure but are passed simply and directly through the actuators themselves. Forces transmitted by the linkages are therefore second order forces only. These are present because the centre of mass of the capsule is not at the intersection of the pitch and roll axes. Anj objective of the mechanism is to ensure that the pitch and roll axes intersect and that the axes both lie in the simulator plane. The simulator operating plane can move vertically. A pitch plane is defined as passing through the roll axis, parallel to the simulator operating plane which contains the moving vertices of the hinge frames. This plane can move vertically and has a variable pitch axis which lies in the pitch plane. Finally the roll plane is defined as passing through the roll axis and being parallel to the simulator operating plane.

As a result the mechanism is constructed so that a slide bearing is provided preferably in the simulator operating plane. This is usually the forward bearing, but not necessarily so, and is usually a universal bearing, although again this is not necessarily the case, and it lies on the roll axis. The pivotal axes of the hinge frames lie in the simulator operating plane. Finally the points of application of thrust of the actuators lie in the simulator operating plane. By following these rules, the present invention does not have large forces generated on any one of the bearings.

As indicated, the actuators are preferably hydraulic rams connected through pivotal points both at the base and on the simulator plane.

Although the actuators are preferably the same length, this is not essential. One or more of the actuators may be a different length to the others. Thus, it is possible for the actuators to be pivotally coupled to the simulator capsule in the simulator operating plane such that the base plane does not lie parallel to the simulator operating plane when the apparatus is at rest.

Figure 2:
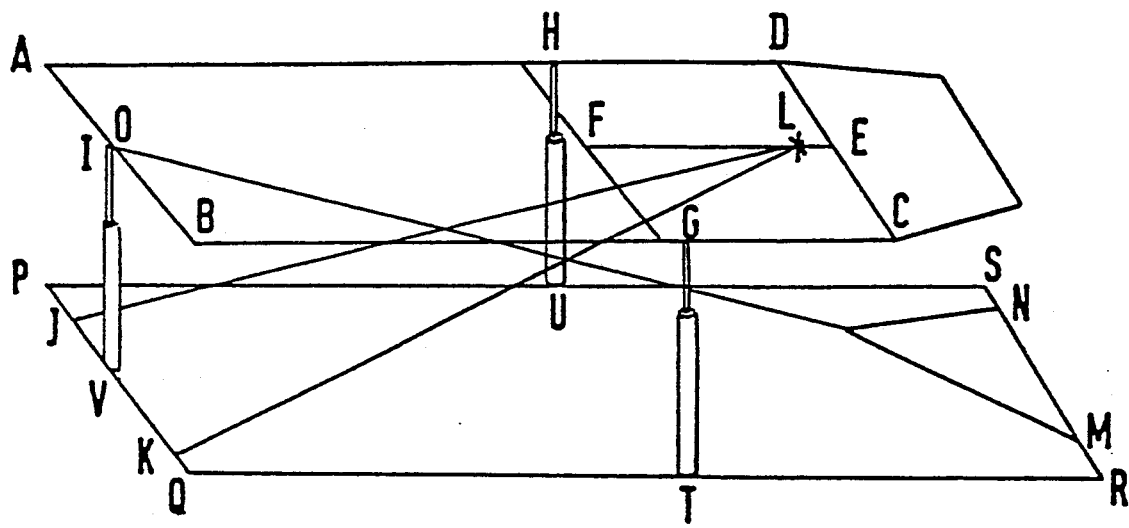
Figure 7:
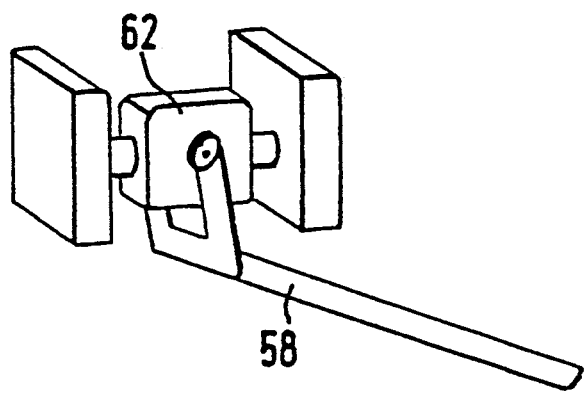
Figure 3:
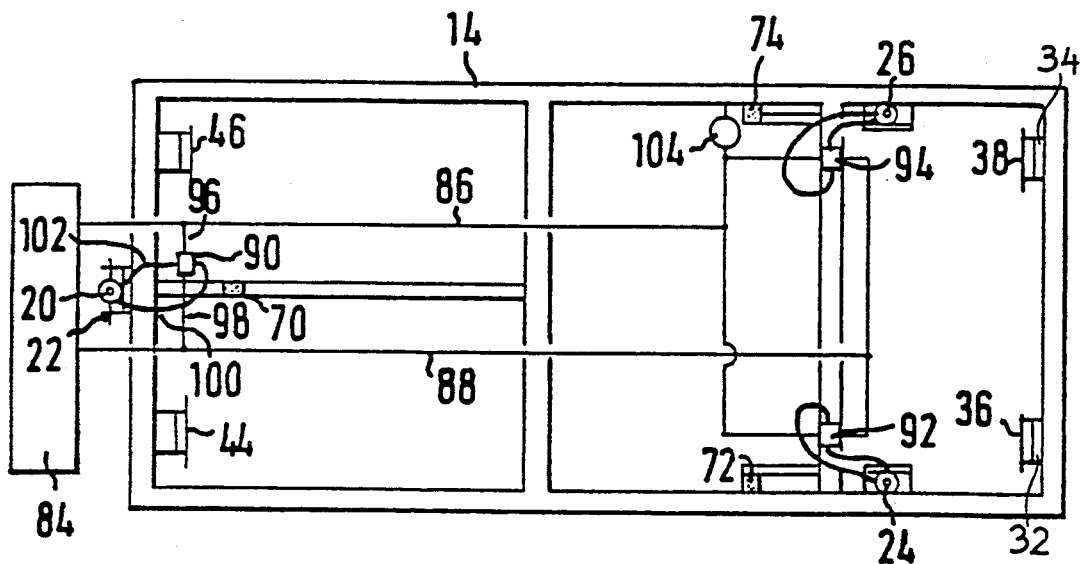
Figure 4:
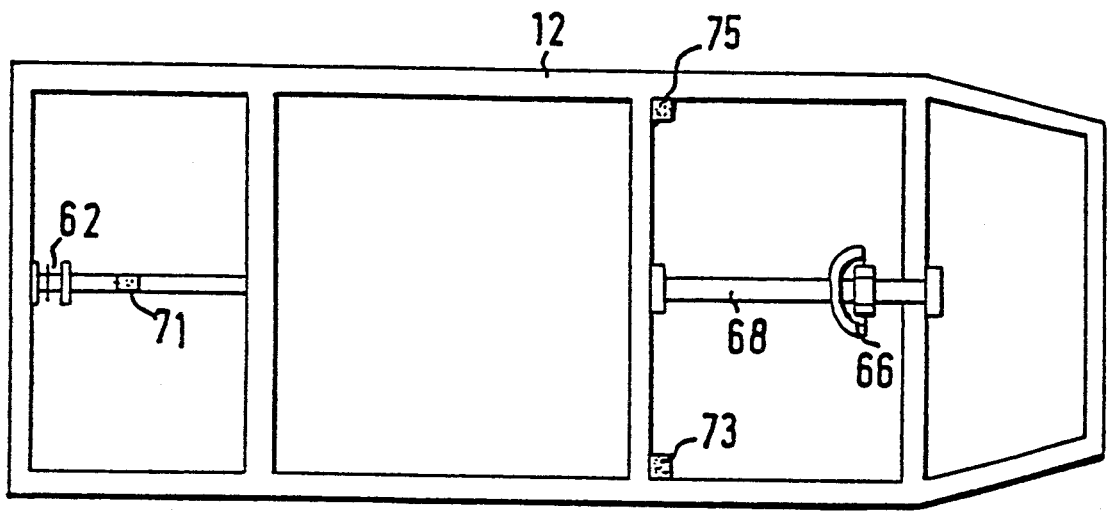
Figure 5:
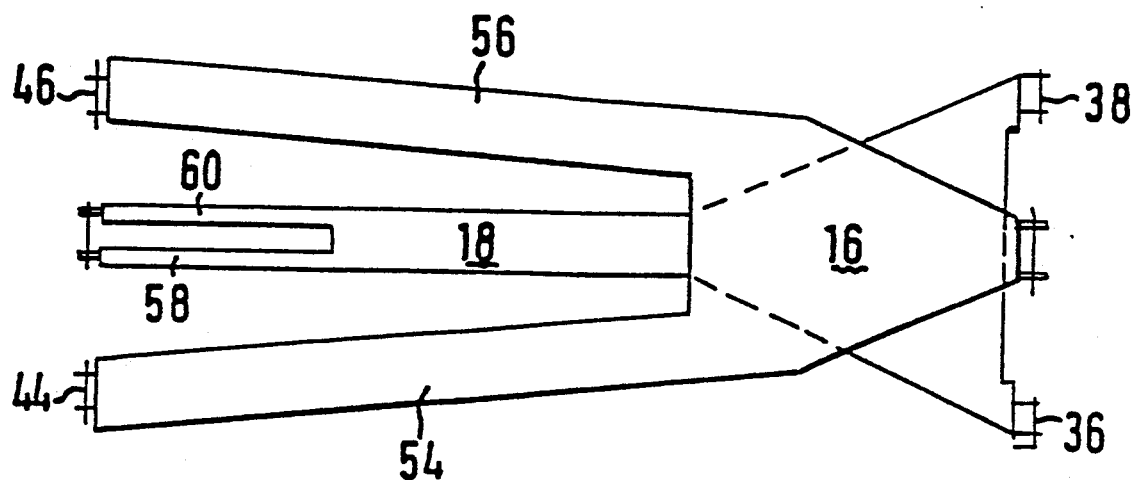
Figure 6:
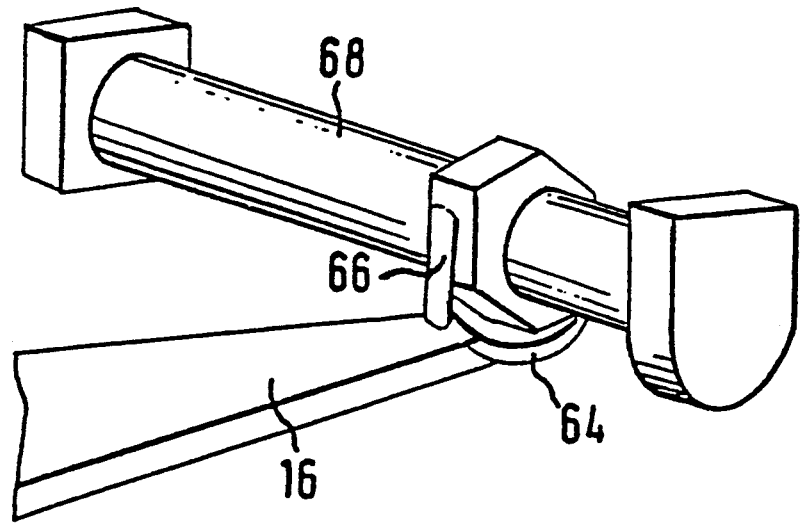
Figure 8:
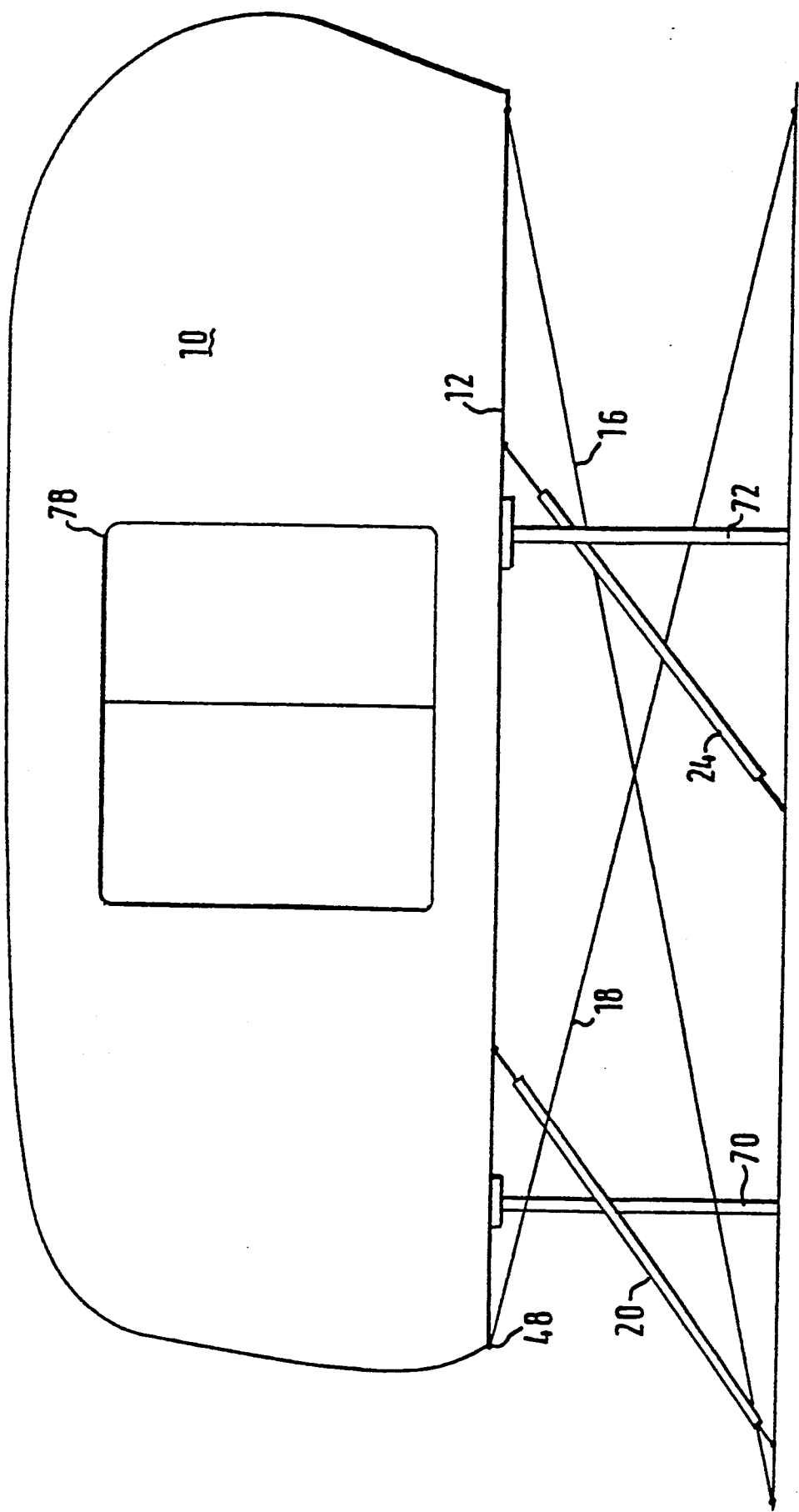

The invention will be further described, by way of example only, with reference to the accompanying drawings, in which:

FIG. 1 is a general perspective view of the simulator mechanism of the present invention, FIG. 2 is a diagrammatic view of the simulator mechanism of the present invention in line drawing, FIG. 3 is a plan view of the base of the simulator mechanism of the present invention, FIG. 4 is a plan view of a platform of the simulator mechanism of the present invention, FIG. 5 is a detailed view of the hinge mechanisms of the simulator, FIG. 6 is a detailed view of the forward slide bearing of the simulator of the present invention, FIG. 7 is a detailed view of the rear universal bearing of the simulator of the present invention, and FIG. 8 is a diagrammatic view of a further embodiment of the simulator mechanism of the present invention.

Referring to the drawings, a capsule 10 is mounted on a platform 12, to provide the simulator operating plane, supported on a base 14 by means of hinge mechanisms 16 and 18. A rear hydraulic ram 20 is connected to the base 14 by a bearing 22 having two degrees of freedom at right angles to one another, effectively a universal joint. Hydraulic rams 24 and 26 are connected via bearings 28 and 30 again having two degrees of rotation, similiar to bearing 22. Hinge frame 18 is connected to the base 14 via bearings 32 and 34 through pins 36 and 38 allowing the hinge frame 18 to move up and down. The rear hinge frame 16 is connected by two bearings 40 and 42 by means of pins 44 and 46 again allowing the rear hinge frame to rotate about the pins.

The upper portions of the hydraulic rams 20, 24 and 26 are connected by bearings 48, 50 and 52 again being rotatable in two axes. The bearings 48, 50 and 52 are mounted on the platform frame 12 upon which a capsule 10 is positioned.

The hinge frames which are effectively A frames interact with one another to allow rotation around pins 36 and 38; and 44 and 46. Both hinge frames 16 and 18 are bifurcated, the rear hinge frame 16 being an A frame having a large bifurcation to allow the forward hinge frame 18, being a T frame, to pass between the fingers 54, 56 of the hinge frame 16. The central portion of hinge frame 18 passes between the fingers 54 and 56 whereas the forward fingers 58 and 60 extend to the pins 36 and 38. The forward hinge frame 18 is bifurcated at its rear end such that it may connect to the universal joint 62 mounted beneath the rear of the platform 12. The rear hinge frame 16 is connected at its upper point via a universal joint 64 to a forward slide bearing 66. The slide bearing 66 has a cylindrical centre portion which allows a slide tube 68 to slide through the bearing 66.

Rest pillars 70, 72 and 74 provide support for the platform in its at rest position, each pillar 70, 72 and 74 being positioned adjacent to one of the hydraulic rams 20, 24 and 26. Rest pillar 70 passes through bifurcation 58, 60 of the rear end of the forward hinge frame 18. The rest pillars 70, 72 and 74 abut pads 71, 73 and 75 respectively on the platform 12.

Various hydraulic connections are made from the rams 20, 24 and 26 as described below with reference to FIG. 3. A control operating console 76 is provided separately from the mechanism of the present invention, to carry the control means via cabling to the mechanisms. A hydraulic unit 84 provides the pressurized fluid to operate the rams 20, 24 and 26.

The capsule 10 contains doors 78 for access to seats 80. Within the capsule 10 is a display screen which may be a video unit or film screen 82 to display visual effects co-ordinated with physical effects provided by the movement of the capsule on its rams 20, 24 and 26. The seating 80 may have enough seating for 10 to 15 occupants to experience both the visual and sensory effects of the simulator of the present invention.

Referring now to FIG. 2 specifically, the platform framework is shown diagrammatically by rectangle A B C D and the base is shown diagrammatically by the rectangle P Q R S. The platform framework A B'C D would normally have a capsule positioned thereon. The hydraulic rams 20, 24 and 26 of FIG. 1 are shown diagrammatically connecting points I V: G T: and H U. The forward hinge frame has pivoting points N M corresponding to pins 38 and 36 in FIG. 1 on the base 14 [P Q R S] and is connected by a bearing 62 [FIG. 7] at point O. The rear hinge frame J K L is connected via pins 42, 44 [J and K] to the base O P Q R and via bearing 64 [FIG. 1] at point L to the slide tube 68 [FIG. 1] along F E The mechanism is constructed so that the slide bearing at point L [which is usually the forward bearing but this is not essential] and the universal bearing at point O [usually the rear bearing but this is not essential] lies on the roll axis i.e. the axis which lies along line E F O.

It is essential that the transverse axis of the forward bearing L and the roll axis along line E F intersect. The transverse axis of both bearings L and O also intersects the line E F O parallel to the line P Q.

The points of application of the thrust of the hydraulic rams G T, H U, I V, all lie in the roll plane which is the same plane as the platform frame A B C D.

It is essential that the mechanism follows the arrangement described above to prevent unnecessary and large twisting forces within the framework.

FIGS. 3 and 4 show plan views of the base 14 and platform 12 respectively.

As shown in FIG. 1 and in FIG. 3 hydraulic unit 84 provides the fluid to drive the rams 20, 24 and 26 through flow lines 86 and return lines 88. Each hydraulic ram 20, 24 and 26 is controlled by a separately operated valve 90, 92 and 94. Valve 90 has an input line 96 and an outlet line 98, the ram being served by an inlet line 100 and an outlet line 102. Similiar control lines serve rams 24 and 26. A pressure tank 104 is provided to maintain the pressure within the system. The valves are controlled by a suitable programme to determine the operational movements of each of the rams 20, 24 and 26 to co-ordinate with the visual effects shown within the capsule on screen 82.

In operation, initially the capsule 10 is positioned on the rest pillars 70, 72 and 74 which supports the weight of the capsule whilst passengers enter through doors 78 to be seated in the rows of seats 80. On operation from the console 76, the rams 20, 24 and 26 extend such that the weight of the capsule is taken from the rest pillars 70, 72 and 74 and is supported by the rams and the hinge brackets 16 and 18. The hinge brackets 16 and 18 act as interlocking scissors pivoting on bearings 32, 34, 40 and 46 on the base and bearings 62 and 66 on the platform 12. At rest, the rams 20, 24 and 26 are contracted and the forward bearing 66 is positioned along the tube 68 in the direction of the front of the capsule. As the capsule rises through extension of the rams 20, 24 and 26, the bearing 66 slides along the tube 68 towards the rear end of the capsule 10. By raising ram 24 either with or without contraction of ram 26 the capsule 10 tilts towards the left. Alternatively, raising ram 26 and either retracting or keeping ram 24 at the set length causes the capsule to tip towards the right. As each ram 20, 24 and 26 is independently operable, an infinite number of combinations of position for the capsule can be attained. By using suitable software from console 26 in conjunction with the operation of the rams as well as in conjunction with the visual effects shown on the screen 82, a suitable ride simulation can be provided within the capsule of vehicles such as cars, motor cycles, boats, airplanes, space vehicles etc.

Although the present invention has been described such that the actuators 22, 24 and 26 are shown in a vertical position, as shown in, for example FIG. 1, in an alternative embodiment of the present invention as shown in FIG. 8, the actuators in a rest position may be angled or on a slant. The important requirement of the embodiment of FIG. 8 is that the restraints are pivotally connected along the roll axes in the same simulator operating plane as the coupling points of the actuators. The reference numerals as used in FIG. 8 designate the same, or similar parts to those shown in FIG. 1.

Thus the platform frame 12 has connected thereto A frames 16 and 18 as well as actuators 20 and 24. Actuators 20 and 24 are shown in their rest positions i.e. when the capsule is not in operation. It can be seen that actuators 20 and 24 [actuator 22 being hidden by actuator 24 in this view] are inclined in the rest position rather than vertical or substantially vertical as shown in FIG. 1. Similar rest posts 70, 72 and 74 are provided to support the weight of the platform 12 when the capsule is at rest.

I claim:

1. A motion simulator mechanism capable of operating in three degrees of freedom and having intersecting roll and pitch axes comprising a base [14] having a fixed plane, a simulator capsule [10] having a simulator operating plane, the base [14] being below the simulator operating plane, three independent extendible actuators [20, 24, 26] capable of changing the position of the simulator operating plane, the three actuators [20, 24, 26] being pivotally coupled at separate points on the fixed plane of the base [14] and at separate points on the simulator operating plane [10], the weight of the simulator capsule [10] and the simulator operating plane when in operation being carried by the three actuators [20, 24, 26], characterised in that the line joining two of the actuators [24, 26] being positioned perpendicular to a longitudinal axis of both the base plane and the simulator operating plane, the third actuator [20] being positioned at one end and on the longitudinal axis of the base plane, and further including at least two passive restraining mechanisms [16, 18] being provided to prevent unwanted motion in yaw, surge and sway axes, the restraints being pivotally connected along the roll axis in the same simulator operating plane as the coupling points of the actuators [20, 24, 26].

2. A simulator as claimed in claim 1 wherein the centre of mass of the simulator capsule is above the triangle formed from the lines joining the connecting point on the actuators in the simulator operating plane.

3. A simulator mechanism as claimed in claim 1 wherein the actuators are fluid operated rams having extendible pistons.

4. A simulator mechanism as claimed in claim 1 wherein there is further included at least one rest post capable of supporting the simulator capsule when the actuators are not in operation.

5. A simulator mechanism as claimed in claim 1 wherein the restraining means are A frames pivotally connected at each A frame apex to said simulator operating plane.

6. A simulator mechanism as claimed in claim 1 wherein the actuators are electrically operated, each actuator comprising an electric motor driving a rack, and a pinion meshing with the rack.

7. A simulator mechanism as claimed in claim 1 wherein the actuators are electrically operated, each actuator comprising an electric motor, a screw and a nut threadably received on the screw.

8. A simulator mechanism as claimed in claim 2 wherein the actuators are fluid operated rams having extendible pistons.

9. A simulator mechanism as claimed in claim 2 wherein there is further included at least one rest post capable of supporting the simulator capsule when the actuators are not in operation.

10. A simulator mechanism as claimed in claim 2 wherein the actuators are electrically operated, each actuator comprising an electric motor driving a rack, and a pinion meshing with the rack.

11. A simulator mechanism as claimed in claim 2 wherein the actuators are electrically operated, each actuator comprising an electric motor, a screw and a nut threadably received on the screw.

* * * * *